United States Patent
Sumi et al.

(10) Patent No.: US 7,409,113 B2
(45) Date of Patent: Aug. 5, 2008

(54) SEMICONDUCTOR ELECTRO-ABSORPTION OPTICAL MODULATOR, SEMICONDUCTOR ELECTRO-ABSORPTION OPTICAL MODULATOR INTEGRATED LASER, OPTICAL TRANSMITTER MODULE AND OPTICAL MODULE

(75) Inventors: Seiji Sumi, Yokohama (JP); Kazuhisa Uomi, Hachioji (JP); Hiroyuki Kamiyama, Saitama (JP); Kazuhiko Naoe, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 525 days.

(21) Appl. No.: 11/019,370

(22) Filed: Dec. 23, 2004

(65) Prior Publication Data

US 2005/0275920 A1    Dec. 15, 2005

(30) Foreign Application Priority Data

Jun. 11, 2004    (JP)    ............... 2004-173450

(51) Int. Cl.
  *G02F 1/035*    (2006.01)
  *G02F 1/295*    (2006.01)
  *G02B 6/12*    (2006.01)
(52) U.S. Cl. .................... 385/2; 385/8; 385/14
(58) Field of Classification Search ............. 385/1–10
  See application file for complete search history.

(56) References Cited

U.S. PATENT DOCUMENTS

| | | | |
|---|---|---|---|
| 6,343,163 B1 * | 1/2002 | Kawanishi | 385/2 |
| 6,613,596 B2 * | 9/2003 | Bloemer et al. | 438/24 |
| 7,061,950 B2 | 6/2006 | Hongo et al. | |
| 2002/0048290 A1 | 4/2002 | Tanaka | |
| 2002/0195622 A1 * | 12/2002 | Ishimura | 257/200 |
| 2003/0057456 A1 * | 3/2003 | Wada | 257/222 |

FOREIGN PATENT DOCUMENTS

| | | |
|---|---|---|
| JP | 2-39467 | 2/1990 |
| JP | 5-257102 | 10/1993 |

(Continued)

OTHER PUBLICATIONS

"Semiconductor Laser" by Ito Ryoichi et al. 1989, p. 277.

(Continued)

*Primary Examiner*—M. R. Connelly-Cushwa
(74) *Attorney, Agent, or Firm*—Mattingly, Stanger, Malur & Brundidge, PC

(57) ABSTRACT

This invention provides an optical transmitter module and an optical module using an EA modulator capable of realizing stable ACER regardless of operating temperature without using a control mechanism for maintaining temperature of the EA modulator constant. In the EA modulator, optical waveguides formed of a multi-layered film are formed on a substrate, an electrical signal is applied to the optical waveguides in a direction vertical to the substrate, and the input light absorption amount is changed to control the amount of output light. Also, a plurality of p-side electrodes electrically separated from each other for applying an electrical signal to the active layer optical waveguides are arranged on optical axes of active layer optical waveguides. The length of optical waveguides to which the electrical signal is applied is changed by controlling the number of p-side electrodes to which the electrical signal is applied in accordance with temperature.

9 Claims, 6 Drawing Sheets

FOREIGN PATENT DOCUMENTS

| | | |
|---|---|---|
| JP | 2002/131714 | 10/1993 |
| JP | 2003/98492 | 4/2003 |
| JP | 2004/61556 | 2/2004 |

OTHER PUBLICATIONS

Electronics Letters Jun. 4, 1992, vol. 28 No. 12. pp. 1157-1558.

"Advantages of InGaAlAs/InGaAlAs-MQW Optical Modulators" by Jun-ichiro Shimizu, et al. pp. 506-507, 2002.

IEEE Photonics Technology Letters, vol. 13, No. 8 (Aug. 2001) "Distributed Effects Model for Cascade Traveling-Wave Electroabsorption Modulator" pp. 791-793.

* cited by examiner

SEMICONDUCTOR ELECTRO-ABSORPTION OPTICAL MODULATOR, SEMICONDUCTOR ELECTRO-ABSORPTION OPTICAL MODULATOR INTEGRATED LASER, OPTICAL TRANSMITTER MODULE AND OPTICAL MODULE

CROSS-REFERENCE TO RELATED APPLICATION

The present application claims priority from Japanese Patent Application JP 2004-173450 filed on Jun. 11, 2004, the content of which is hereby incorporated by reference into this application.

TECHNICAL FIELD OF THE INVENTION

The invention relates to a semiconductor electro-absorption optical modulator (hereinafter, referred to as EA (Electro-Absorption) modulator) having a plurality of electrodes. More particularly, it relates to a technique which is effective when applied to a semiconductor EA optical modulator integrated laser, in which the EA modulator and a semiconductor laser device are integrated, an optical transmitter module, and an optical module.

BACKGROUND OF THE INVENTION

Conventionally, the EA modulator used in an optical communication system is used in combination with a semiconductor laser device as an optical transmitter module, and generally has the configuration as follows. That is, in this configuration, the temperatures of the semiconductor laser device and the EA modulator are set to be constant by using a temperature control mechanism and continuous light which is outputted by injecting a driving current into the semiconductor laser device is modulated by applying an electrical signal to the EA modulator so as to output the signal light. At this time, an extinction ratio at the time of modulation (hereinafter, referred to as ACER (Alternating Current Extinction Ratio)) which is an intensity ratio of an ON level and an OFF level of the signal light is stabilized usually by keeping the temperature of the EA modulator constant.

The usual optical transmitter module is described in "Semiconductor Laser" by Ito Ryoichi and Nakamura Michiharu, Baifuukan, 1989, p. 277. Further, the usual EA modulator is described in "Electron Lett. vol 28", pp. 1157 to 1158, 1992.

Meanwhile, in the recent optical transmitter modules to be applied to optical communication systems, not only the improvement of transmission properties such as high speed and large capacity but also the size reduction, electric power saving and low cost are required. For this reason, in recent years, optical modules which do not require the temperature control mechanism are demanded. Conventionally, in the optical transmitter modules using the EA modulators, in order to keep ACER stable regardless of ambient temperature, the temperature control mechanism which keeps the temperature of the EA modulators constant is indispensable. This will be described in detail below.

The ACER is determined by an extinction curve at the time when a DC voltage is applied to the EA modulator (hereinafter, referred to as DCER curve). When the voltage is applied to the EA modulator, a laser beam inputted into the EA modulator is absorbed by the EA modulator, and a light output which is attenuated by the inputted laser beam is outputted from the EA modulator. The amount of attenuation depends on the voltage applied to the EA modulator (hereinafter, referred to as VEA), and a relationship between the attenuation amount and VEA is expressed by a DCER curve. The ACER is proportional to a difference in DCER (hereinafter, referred to as ADCER) between a high level of an electrical signal (hereinafter, referred to as VOH (Voltage Of High)) and a low level thereof (hereinafter, referred to as VOL (Voltage Of Low)) to be applied to the EA modulator. That is, when the difference in DCER between VOH and VOL is large, the ACER also becomes large. Therefore, when the DCER curve, the VOH and the VOL do not change, the ACER is constant.

Further, the DCER curve changes in accordance with the change in temperature of the EA modulator and the semiconductor laser device. This is because an absorption end wavelength of the EA modulator (hereinafter, referred to as λEA) and an oscillation wavelength of the semiconductor laser device (λDFB) to be inputted have different shift amounts depending on temperature. The difference between λEA and λDFB is called a detune amount, and the detune amount changes in accordance with the temperature. When the temperature is high, the detune amount becomes small, and when the temperature is low, the detune amount becomes large. When the detune amount is large, even if a voltage applied is increased, the EA modulator cannot sufficiently absorb light. This is because when the detune amount becomes large, confinement of electrons and holes in a light absorption layer of the EA modulator at the time of applying a voltage becomes weak, namely, the absorption factor of the EA modulator decreases, and thus, the DCER becomes small in a deep voltage area. FIG. 6 illustrates the change of the DCER curve depending on the temperature.

In FIG. 6, the horizontal axis represents an applied voltage to EA modulator VEA, and the vertical axis represents the extinction ratio DCER at the time of applying the DC voltage. As the temperature becomes lower, the DCER in an area with large VEA becomes smaller, and thus, ΔDCER which is equivalent to that at the high temperature cannot be obtained. For this reason, in the optical transmitter module using the EA modulator, the temperature control mechanism, which keeps the temperature of the EA modulator and the semiconductor laser device constant, is indispensable in order to keep the DCER curve constant.

Generally, the EA modulator is used in combination with the semiconductor laser device. However, when the temperature control mechanism is not necessary, a light output from the semiconductor laser device is lowered at the time of the high-temperature operation, and thus, the light output from the EA modulator is decreased.

SUMMARY OF THE INVENTION

In order to solve the problems described above, a main object of the present invention is to realize stable ACER regardless of operating temperature without a control mechanism which keeps the temperature of an EA modulator constant in an optical transmitter module and an optical module using the EA modulator.

An essential feature of the present invention is to use the EA modulator in which a plurality of electrodes which are electrically separated from each other are arranged on an optical axis. As expressed by the following formula (1), ACER is proportional to an absorption factor of a multi quantum well ΓMQW, a change in absorption factor ΔαABS, and a length of the EA modulator Lmod. Therefore, the ACER can be increased by increasing the length of the EA modulator.

$$ACER \propto \Gamma MQW \times \Delta\alpha ABS \times Lmod \quad (1)$$

That is, by increasing the length of the EA modulator, the ACER equivalent to that at high temperature can be obtained at low temperature. In this invention, by providing a plurality of electrodes onto the EA modulator, the ACER which is obtained when a signal voltage is applied to only one electrode at high temperature can be obtained even at low temperature. More specifically, since the signal voltage is applied also to other electrodes in a low-temperature operation, the effective operation length of the EA modulator is increased and a DCER curve at low temperature can be made equivalent to a DCER curve at high temperature. Therefore, the ACER equivalent to that at high temperature can be obtained. As described above, according to the present invention, the number of electrodes to which a signal is applied is changed in accordance with the temperature without controlling the temperature of the EA modulator. By doing so, it is possible to keep the ACER constant in a wide temperature range.

Further, the EA modulator functions as an optical amplifier by applying the direct current. Therefore, by applying a direct current to an electrode to which the electrical signal is not applied, the decrease in the light output in the high-temperature operation can be compensated, and thus, the stable light output can be obtained even in high temperature. In other words, by changing the value of the direct current to be applied between the high-temperature operation and the low-temperature operation, the stable light output can be realized in a wide temperature range.

BRIEF DESCRIPTIONS OF THE DRAWINGS

Preferred embodiments of the present invention will now be described in conjunction with the accompanying drawings, in which.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

A first embodiment of the present invention is characterized by the followings. That is, an EA modulator is provided, in which an optical waveguide formed of a multi-layer film is formed on a substrate, an electrical signal is applied to the optical waveguide in a direction vertical to the substrate, and the absorption amount of inputted light is changed so as to control the amount of light to be outputted. Also, a plurality of electrodes which are electrically separated from each other are arranged in the EA modulator, and when an electrical signal is applied to the EA modulator, the number of electrodes to which the signal is applied differs depending on temperature.

Figure 1A:
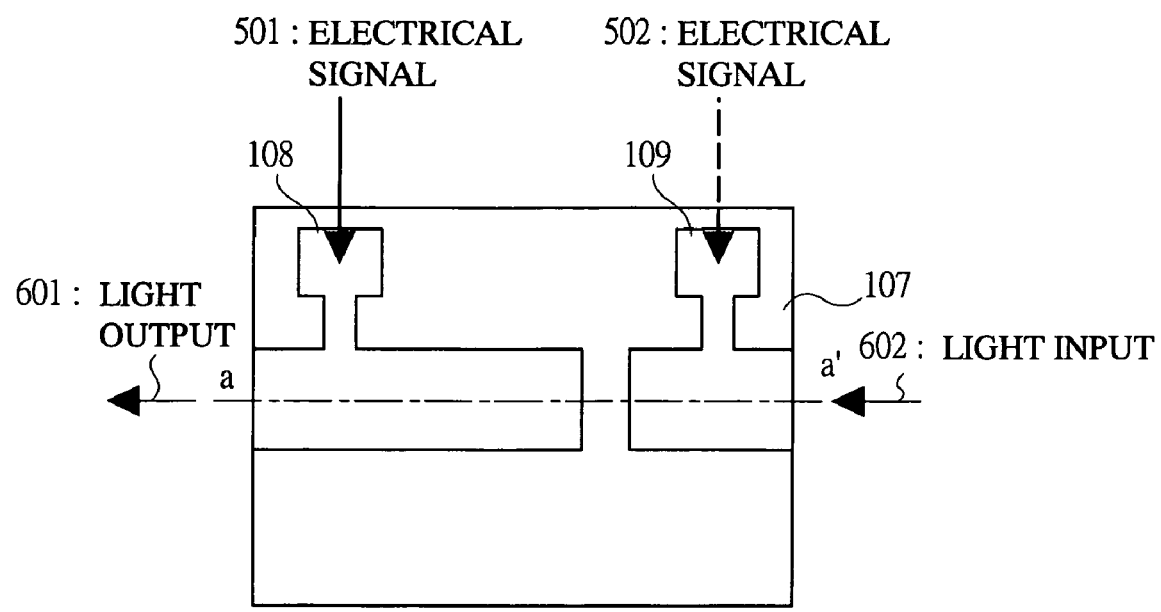
FIG. 1A is a plan view illustrating an EA modulator according to a first embodiment of the present invention.
Figure 1B:
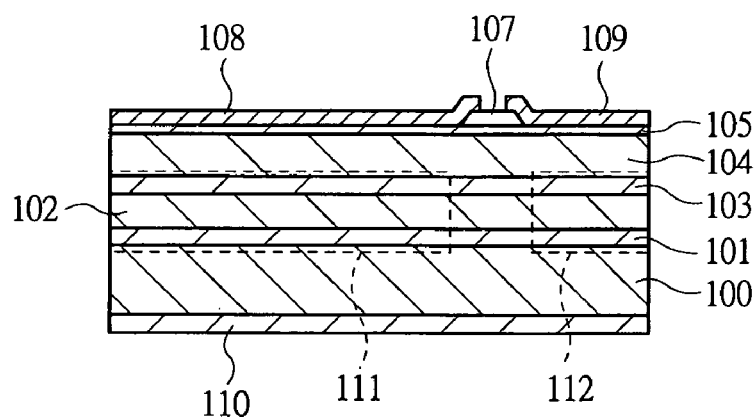
FIG. 1B is a sectional view taken along the line a-a' in FIG. 1A.

With reference to FIGS. 1A and 1B, an example of the configuration of the EA modulator according to the first embodiment will be described. FIG. 1A is a plan view illustrating the EA modulator, and FIG. 1B is a sectional view taken along the line a-a' in FIG. 1A.

The EA modulator of this embodiment is an example of a semiconductor EA modulator for optical transmission at a transmission rate of 10 Gbit/s, 40 km and having a wavelength of 1.5 µm band. This device is formed in the manner as follows. First, as the first crystal growth, a lower InGaAsP light guide layer 101, a strained multi quantum well layer (hereinafter, referred to as multi quantum well (MQW)) 102 including 8 cycles of InGaAsP well layers and barrier layers, an upper InGaAsP light guide layer 103, an InP clad layer 104, and an InGaAs contact layer 105 are formed on an n-type InP semiconductor substrate 100 by a well-known selective growth method using an organic metal vapor phase method.

Next, in order to form an optical waveguide of the EA modulator, active layer optical waveguides 111 and 112 are formed by wet etching using a normal lithography technique and Br etchant. Further, for the capacity reduction, the buried growth of the Fe—InP layer is carried out on both sides of the optical waveguides.

Subsequently, after a passivation film 107 is formed over the semiconductor, through holes are formed so that an electric field can be applied to the active layer optical waveguides. The through holes are not formed over the whole active layer light waveguides, but the through holes of 125 µm and 50 µm are formed on two places such as on a light output side and on a light input side, respectively. Then, two p-side electrodes 108 and 109 which are electrically separated form each other are formed on the through holes, respectively. And thereafter, an n-side electrode 110 is formed, thereby the device shown in FIGS. 1A and 1B is fabricated.

In this EA modulator, its end surface is subject to antireflection coating. For example, an entire length of the EA modulator is 200 µm, a length of the p-side electrode 108 is 130 µm, and a length of the p-side electrode 109 is 50 µm. In this case, the active layer optical waveguide of the EA modulator can be divided into two areas such as an active layer optical waveguide 111 which is provided just below the p-side electrode 108 and has a length of 130 µm and an active layer optical waveguide 112 which is provided just below the p-side electrode 109 and has a length of 50 µm. The active layer optical waveguide mentioned here indicates the optical waveguide whose light absorption amount is changed when an electric field is applied. Further, the active layer area which is not covered with the p-side electrode becomes a passive optical waveguide which hardly absorbs light.

As one example, the simulation result under the condition that the high temperature is about 80° C. and the low temperature is about 0° C. in the EA modulator of the first embodiment will be described.

In the high-temperature operation at about 80° C., an electrical signal 501 is applied to only the active layer optical waveguide 111 through the p-side electrode 108 on the side of the light output 601. At this time, since an electrical signal 502 is not applied to the p-side electrode 109 on the side of the light input 602, only the active layer optical waveguide 111 is actually operated and the other area becomes a passive optical waveguide. The ACER of 9 dB can be obtained by the drive in which the amplitude of the electrical signal (hereinafter, referred to as Vpp) is 1.7 V and VOH is −0.2 V.

In the low-temperature operation at about 0° C., when the electrical signal is applied to only the active layer optical waveguide 111, the ACER becomes 7 dB under Vpp of 2.8 V and VOH of −1.3 V, and thus, the ACER is smaller than that in the high-temperature operation.

In such a case, if the electrical signals 501 and 502 are applied to the active layer optical waveguides 111 and 112, respectively, the active layer optical waveguides 111 and 112 absorb light. As a result, the effective operation length of the EA modulator, namely, the length of the active layer optical waveguide can be increased in comparison to that in the high-temperature operation, and the ACER of 9 dB can be obtained. As described above, by applying the electrical signals to more electrodes in the low-temperature operation than in the high-temperature operation to increase the effective operation length of the active layer optical waveguide, the equivalent ACER can be realized in a wide temperature range.

In this case, the number of the p-side electrodes is two. However, the suitable length of the EA modulator and the suitable number of the p-side electrodes to be formed differ depending on the necessary ACER.

In the first embodiment, the four-element mixed crystal containing InGaAsP which is a p-type material is used for the multi quantum well layer of the EA modulator. On the contrary, when an Al material is used for the multi quantum well layer, a modulator whose chirp is low and extinction ratio is large can be designed owing to its characteristic of band offset (refer to "J.Shimizu, et al., Tech. Dig. 7th Optoelectronics and Communications Conference (OECC2002), pp 506-507, 2002"). Also in this case, the similar effect can be obtained by using the electrode configuration according to the first embodiment.

Therefore, according to the EA modulator of this embodiment, the electrical signal is applied to only the p-side electrode 108 in the high-temperature operation, and the electrical signal is applied to both the p-side electrodes 108 and 109 in the low-temperature operation. As a result, the equivalent ACER can be obtained in both the low-temperature operation and the high-temperature operation. In this case, when the number of electrodes to which an electrical signal is applied is increased in accordance with the operating temperature change from high temperature to low temperature, the number is sequentially increased from the side of the light output such that the electrical signal is applied first to only the p-side electrode 108 and next to the p-side electrodes 108 and 109. On the contrary, when the number of electrodes to which an electrical signal is applied is decreased in accordance with the operating temperature change from the low temperature to the high temperature, the number is sequentially decreased from the side of the light input such that the electrical signal is applied first to the p-side electrodes 108 and 109 and next to only the p-side electrode 108. In this manner, by changing the number of electrodes to which the electrical signal is applied in accordance with the operating temperature, the ACER can be kept constant in the wide temperature range.

Second Embodiment

A second embodiment of the present invention is characterized by the followings. That is, a plurality of electrodes which are electrically separated from each other are arranged in the EA modulator described in the first embodiment, and when an electrical signal is applied to the EA modulator, the number of electrodes to which the electrical signal is applied differs depending on the temperature. In addition, a direct current in a forward direction is injected into electrodes to which the electrical signal is not applied. More specifically, the second embodiment is an example in which the direct current is injected into the electrodes to which an electrical signal is not applied at the time of the high-temperature operation.

Figure 2A:
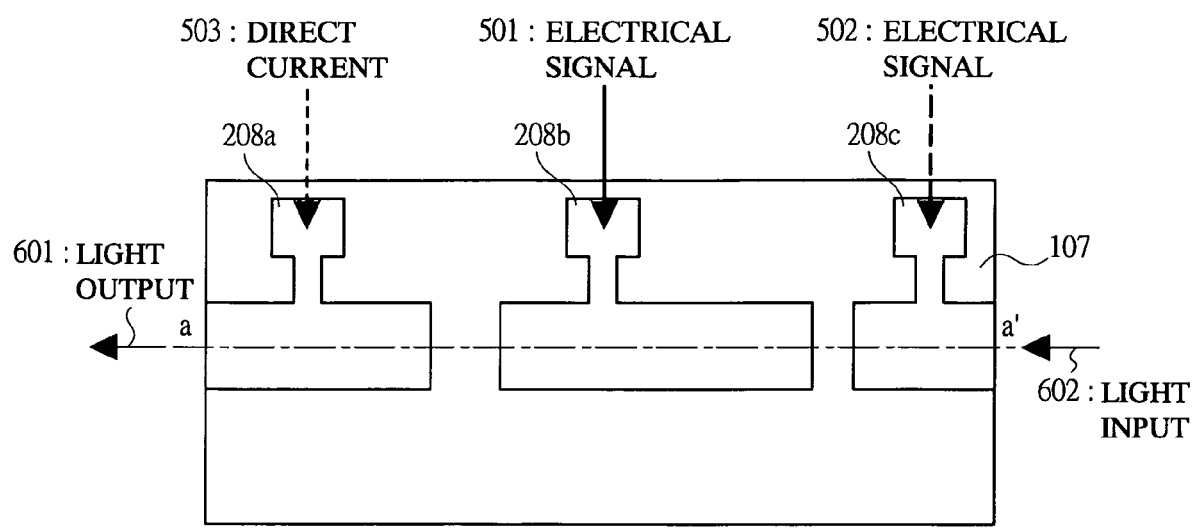
FIG. 2A is a plan view illustrating the EA modulator according to a second embodiment of the present invention.
Figure 2B:
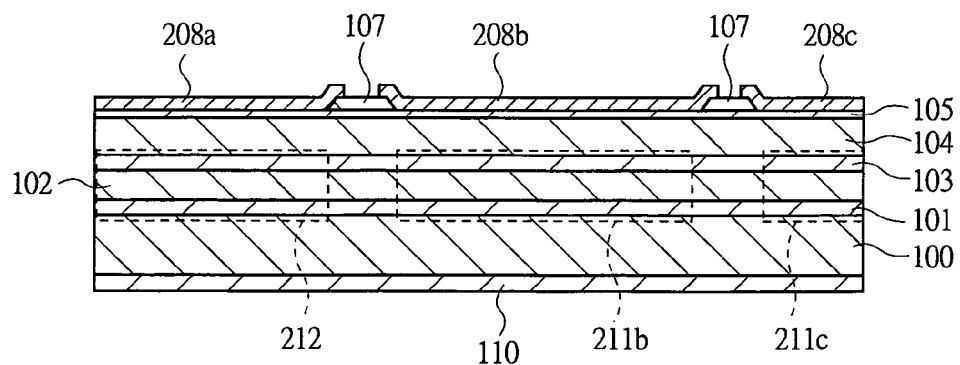
FIG. 2B is a sectional view taken along the line a-a' in FIG. 2A.

With reference to FIGS. 2A and 2B, one example of the configuration of the EA modulator according to the second embodiment will be described. FIG. 2A is a plan view of the EA modulator, and FIG. 2B is a sectional view taken along the line a-a' in FIG. 2A.

The basic configuration of the EA modulator according to the second embodiment is approximately similar to that of the EA modulator according to the first embodiment. Therefore, components which are substantially the same as those in FIGS. 1A and 1B are denoted by the same reference numerals, and detailed description thereof will be omitted.

In the second embodiment, three through holes are formed, and p-side electrodes 208a, 208b and 208c which are electrically separated from each other are fabricated. Also, in the second embodiment, for example, the entire length of the EA modulator is 300 μm, the length of the p-side electrode 208a is 80 μm, the length of the p-side electrode 208b is 130 μm, and the length of the p-side electrode 208c is 50 μm. As a result, the active layer optical waveguide of the EA modulator can be operated as the two areas of the active layer optical waveguide 211b just below the p-side electrode 208b and the active layer optical waveguide 211c just below the p-side electrode 208c. Further, by applying the direct current in the forward direction is injected into an optical gain area 212 just below the p-side electrode 208a, the effect of optical amplification can be obtained. In this case, the optical waveguide in which the optical amplification occurs by injecting the direct current in the forward direction is called an optical gain area. Note that the active layer area which is not covered with the p-side area becomes the passive optical waveguide which hardly absorbs light.

The EA modulator usually absorbs a slight amount of light even in the state where the electrical signal is not applied. Since a detune amount becomes small in the high-temperature operation, the amount of light to be absorbed becomes large. Also, an output level of output light from a semiconductor laser device as an input light source is lowered in the high-temperature operation. Therefore, the light output in the high-temperature operation is possibly lowered in comparison to that in the low-temperature operation. On the other hand, the EA modulator of the second embodiment can be operated as the optical amplifier by injecting a direct current because of its configuration.

Similar to the first embodiment, the simulation results obtained under the condition that the high temperature is about 80° C. and the low temperature is about 0° C. in the EA modulator of the second embodiment will be described.

In the operation at 0° C., the electrical signals 501 and 502 are applied to the active layer optical waveguides 211b and 211c through the p-side electrodes 208b and 208c, and 50 mA of the direct current 503 is injected into the optical gain area 212 through the p-side electrode 208a. The light output from the EA modulator at this time is +1 dBm.

Next, in the operation at 80° C., the electrical signal 501 is applied to only the active layer optical waveguide 211b through the p-side electrode 208b, and 120 mA of the direct current 503 is injected into the p-side electrode 208a. As a result, the light output of +1 dBm can be realized also in the operation at 80° C. similarly to the operation at 0° C. In addition, when the optical gain area 212 is fabricated, the thickness thereof is made larger than those of the active layer optical waveguides 211b and 211c by using the selective growth method, and a gain wavelength in the optical gain area 212 is made to be equivalent to the input light wavelength. As a result, the effect of the optical amplification is enhanced.

In this case, the number of the p-side electrodes is three. However, the suitable length of the EA modulator and the suitable number of the p-side electrodes to be formed differ depending on the necessary ACER. Further, by changing the direct current injected into the optical gain area 212 in accordance with the necessary light output, the stable light output can be realized in the wide temperature range.

In the second embodiment, the four-element mixed crystal containing InGaAsP which is a p-type material is used for the multi quantum well layer of the EA modulator. On the contrary, when an Al material is used for the multi quantum well layer, a modulator whose chirp is low and extinction ratio is large can be designed owing to its characteristic of band offset similarly to the first embodiment. Also in this case, the similar effect can be obtained by using the electrode configuration according to this embodiment.

Therefore, according to the EA modulator of the second embodiment, the same effect as that in the first embodiment can be obtained also in the actual operation. Further, by applying the direct current to the p-side electrode 208a in the optical gain area, the EA modulator can be operated as the optical amplifier. As a result, since the reduction of the light output in the high-temperature operation can be compensated by controlling the value of the direct current to be applied in the high-temperature operation and the low-temperature operation, the stable light output can be obtained. For this reason, the stable light output can be realized in the wide temperature range.

Third Embodiment

A third embodiment of the present invention is applied to an EA modulator integrated DFB laser, in which the EA modulator described in the first and second embodiments and the semiconductor laser device are integrated on one chip in a monolithic manner.

Figure 3A:
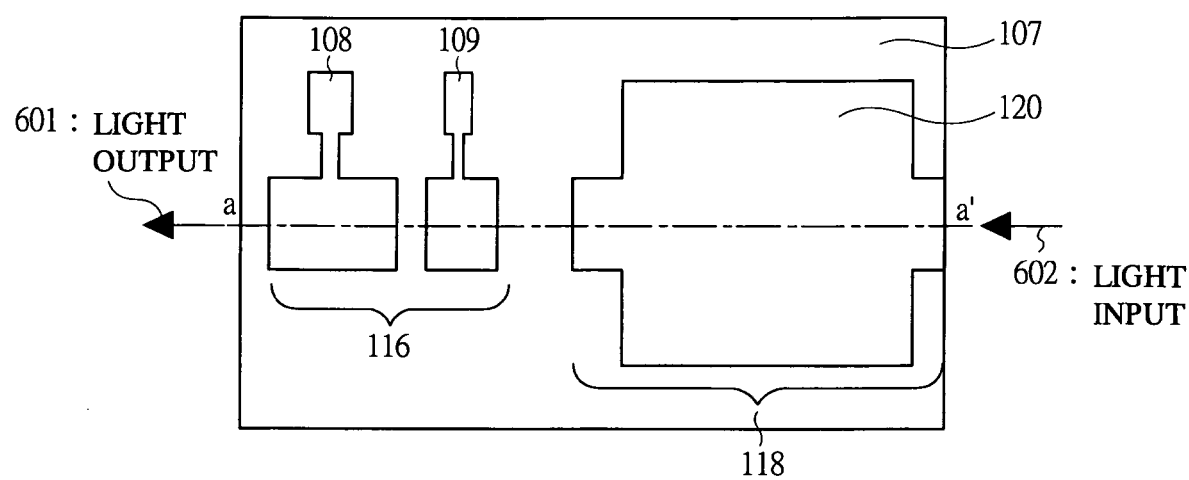
FIG. 3A is a plan view illustrating the EA modulator integrated DFB laser according to a third embodiment of the present invention.
Figure 3B:
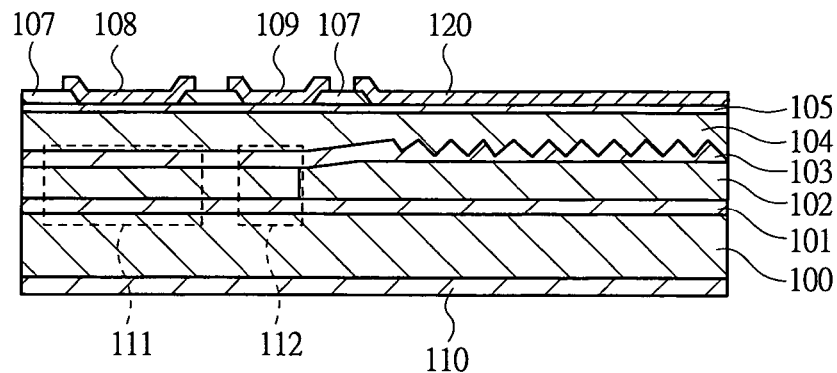
FIG. 3B is a sectional view taken along the line a-a' in FIG. 3A.

With reference to FIGS. 3A and 3B, one example of a configuration of the EA modulator integrated DFB laser according to the third embodiment will be described. FIG. 3A is a plan view of the EA modulator integrated DFB laser, and FIG. 3B is a sectional view taken along the line a-a' in FIG. 3A.

The EA modulator integrated DFB laser according to the third embodiment is an example of a semiconductor EA modulator integrated DFB laser with wavelength of 1.5 μm band for optical transmission of 40 km at transmission rate of 10 Gbit/s. This device is formed in the manner as follows. First, after an oxide film mask for selective growth is formed on the n-type InP semiconductor substrate 100, as the first crystal growth, the lower InGaAsP light guide layer 101, the multi quantum well 102 including 8 cycles of InGaAsP well layers and barrier layers, and the upper InGaAsP light guide layer 103 are formed by a well-known selective growth method using an organic metal vapor phase method. The use of the selective growth makes the total thickness of the multi quantum well in the EA modulator 116 thinner than the thickness in the DFB laser 118. Therefore, a multi quantum well layer absorption end wavelength in the EA modulator 116 is smaller than an oscillation wavelength in the DFB laser 118.

Further, after a diffraction grating is formed, the InP clad layer 104 and the InGaAs contact layer 105 are formed. The optical waveguide of the EA modulator 116 includes the lower InGaAsP light guide layer 101, the multi quantum well 102 and the upper InGaAsP light guide layer 103 where light is absorbed at the time of operating the EA modulator. Thereafter, the buried growth of the Fe—InP layer is carried out on both sides of the optical waveguides. Simultaneously, a window structure without the optical waveguide is formed on an outgoing side of the EA modulator.

Subsequently, through holes are formed so that an electric field can be applied to the active layer optical waveguide of the EA modulator 116 and a direct current can be injected into the DFB laser 118. The through holes are formed on two places in the EA modulator 116 similarly to the first embodiment and on one place in the DFB laser 118. Next, the p-side electrodes are formed. The p-side electrodes 108 and 109 which are electrically separated from each other are formed in the EA modulator 116 so as to cover the through holes formed previously, respectively, and the p-side electrode 120 is formed on the DFB laser 118. And thereafter, an n-side electrode 110 is formed, thereby fabricating the device shown in FIGS. 3A and 3B.

In the FA modulator integrated DFB laser, the EA modulator end surface is subject to antireflection coating. For example, the length of the DFB laser is 400 μm. Also, an entire length of the EA modulator is 200 μm, a length of the p-side electrode 108 is 130 μm, and a length of the p-side electrode 109 is 50 μm. In this case, the active layer optical waveguide of the EA modulator 116 can be divided into two areas such as an active layer optical waveguide 111 which is provided just below the p-side electrode 108 and has a length of 130 μm and an active layer optical waveguide 112 which is provided just below the p-side electrode 109 and has a length of 50 μm. Further, the active layer area which is not covered with the p-side electrode becomes a passive optical waveguide which hardly absorbs light.

Also in the third embodiment, the effect similar to that in the first embodiment can be obtained, and the ACER can be kept constant in the wide temperature range by changing the number of electrodes to which the electrical signal is applied in accordance with temperature. Further, it goes without saying that the effect of the optical amplification can be obtained by applying a direct current to the electrode to which the signal voltage is not applied as described in the second embodiment.

In the third embodiment, the crystal selective growth method of collectively growing the multi quantum well layer in the EA modulator 116 and the multi quantum well layer in the DFB laser 118 is used as a method for integrating the EA modulator and the laser. However, it is also possible to use a butt joint method in which crystal is independently grown. Even in this case, the similar effect can be obtained by forming the electrodes which are electrically separated from each other on the EA modulator and by changing the number of electrodes to which the signal voltage is applied in accordance with temperature.

Fourth Embodiment

A fourth embodiment of the present invention is applied to an optical transmitter module mounted with at least the EA modulator described in the first and second embodiments and the semiconductor laser device.

Figure 4:
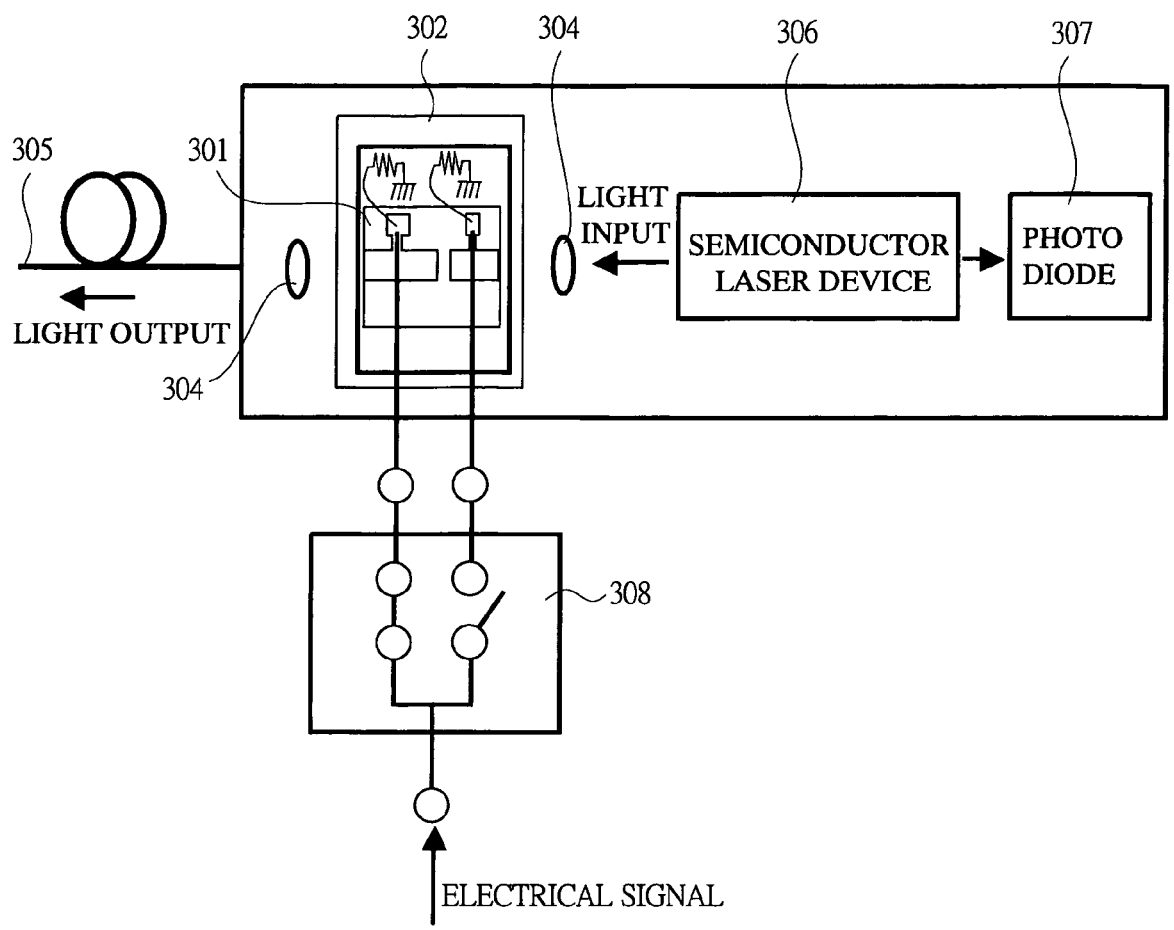
FIG. 4 is a block diagram illustrating an optical transmitter module according to a fourth embodiment of the present invention.

With reference to FIG. 4, one example of a configuration of the optical transmitter module according to the fourth embodiment will be described. FIG. 4 is a block diagram illustrating the optical transmitter module.

The optical transmitter module of the fourth embodiment is formed in the following manner. First, the EA modulator 301 for 10 Gbit/s optical transmission described in the first and second embodiments is mounted on a chip carrier 302 with a termination resistor designed for high frequency. Subsequently, a lens 304, an optical fiber 305, a semiconductor laser device 306 and the like are mounted on one package. At this time, the light from the semiconductor laser device 306 is jointed to an input side of the EA modulator 301 through the lens 304 by using the hybrid integration. Note that the optical transmitter module is not mounted with a temperature control mechanism such as a Peltier device.

In the optical transmitter module of the fourth embodiment, the semiconductor laser device 306 receives a light output by the backward photodiode 307 and is operated so that its output becomes constant by APC (Automatic Power control) that controls a driving current to the semiconductor laser device 306 so that the value of a photocurrent converted in the photodiode 307 becomes constant. Also, the FA modulator 301 is driven by a modulator driving unit 308 having a switching circuit which controls the number of electrodes for applying an electric field to the active layer waveguides in the EA modulator 301 in accordance with temperature. Also in such an optical transmitter module, the effect described in the first and second embodiments can be obtained, and the ACER of 10 dB and the light output of +1 dBm are realized in a range from −5° C. to +85° C.

Fifth Embodiment

A fifth embodiment of the present invention is applied to an optical module mounted with at least the optical transmitter module described in the fourth embodiment in a package.

Figure 5:
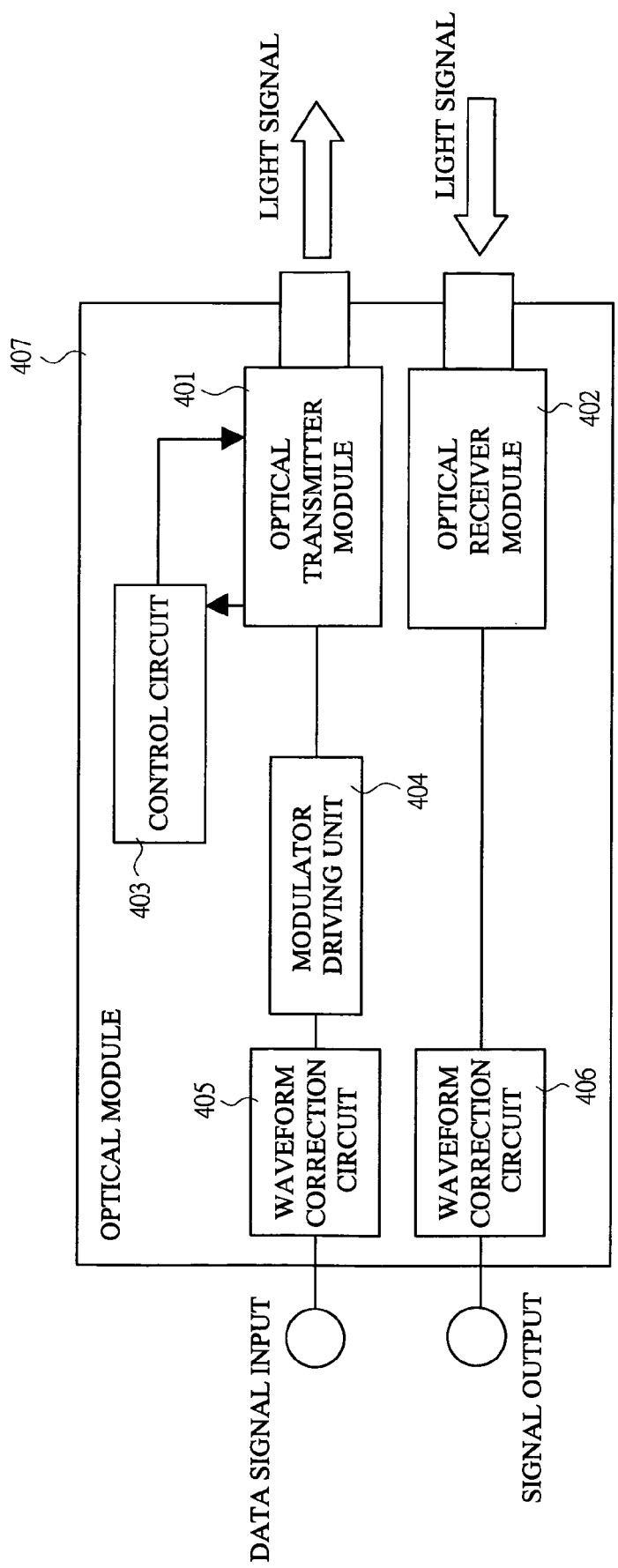
FIG. 5 is a block diagram illustrating an optical module according to a fifth embodiment of the present invention.
Figure 6:
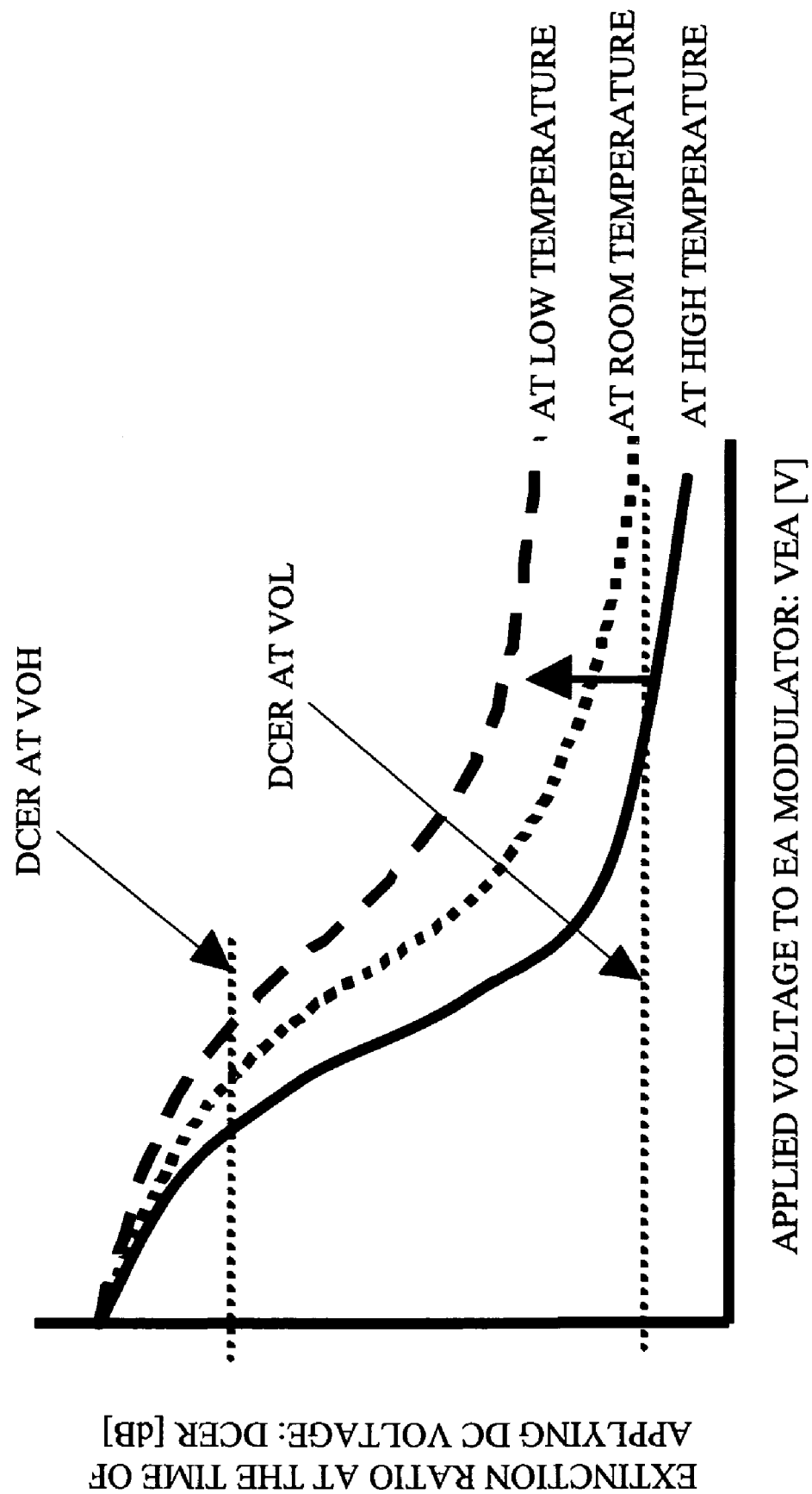
FIG. 6 is a diagram illustrating voltage dependence of an extinction ratio of the EA modulator and a change of DCER curve depending on temperature.

With reference to FIG. 5, one example of a configuration of the optical module according to the fifth embodiment will be described. FIG. 5 is a block diagram illustrating the optical module.

The optical module 407 according to the fifth embodiment has the optical transmitter module 401 described in the fourth embodiment, an optical receiver module 402, a control circuit 403 that controls a laser driving current, a modulator driving unit 404, a waveform correction circuit 405 that corrects an electrical waveform of a modulated input signal, and a waveform correction circuit 406 that corrects an electrical waveform of a received output signal.

In the fifth embodiment, since the optical transmitter module 401 is mounted, the optical module 407 which is small and has low power consumption can be obtained. Also in such an optical module 407, the effect described in the first and second embodiments can be obtained, and the ACER of 9.5 dB and the light output of +1 dBm are realized in a range from −5° C. to +85° C.

In the foregoing, the present invention has been concretely described based on the embodiments. However, it is needless to say that the present invention is not limited to the foregoing embodiments. For example, the present invention can be applied also to a semi-cooled optical transmitter module and a semi-cooled optical module which do not use the temperature control in all temperature range, that is, the temperature control is not used in the range from 0 to 40° C. but the temperature control using a Peltier device is used in the range not less than 45° C.

According to the present invention, it is possible to provide the EA modulator, the optical transmitter module or the optical module that can obtain stable ACER in a wide temperature range without using the temperature control mechanism for maintaining the temperature of the EA modulator constant. Further, by using the EA modulator, the optical transmitter module, or the optical module, the ACER can be controlled to be constant regardless of aged deterioration and environmental change. According to the present invention, therefore, it is possible to realize a highly-reliable, compact, and energy-saving optical transmitter module and an optical module at low cost.

What is claimed is:

1. An optical transmitter module comprising:
   a semiconductor laser device;
   a semiconductor electro-absorption optical modulator in which an optical waveguide composed of a multi-layered film is formed on a substrate, an electrical signal is applied to said optical waveguide in a direction vertical to said substrate, and the absorption amount of input light is changed to control the amount of light to be outputted; and
   a modulator driving unit applying an electrical signal to said semiconductor electro-absorption optical modulator,
   wherein said semiconductor electro-absorption optical modulator includes a plurality of electrodes electrically separated from each other, which are arranged on an optical axis of said optical waveguide and apply an electrical signal to said optical waveguide, and
   said modulator driving unit includes a switching circuit which increases or decreases the number of electrodes for applying an electric field to an active layer waveguide of said semiconductor electro-absorption optical modulator in accordance with temperature.

2. The optical transmitter module according to claim 1, wherein said modulator driving unit performs a control so that the number of electrodes to which the electrical signal is applied in a low-temperature operation is increased in comparison to that in a high-temperature operation.

3. The optical transmitter module according to claim 2, wherein, when the number of electrodes to which the electrical signal is applied is increased in accordance with the operating temperature change from high temperature to low temperature, said modulator driving unit sequentially increases the number of electrodes from a light output side in said semiconductor electro-absorption optical modulator.

4. The optical transmitter module according to claim 3, wherein, when the number of the electrodes to which the electrical signal is applied is decreased in accordance with the operating temperature change from low temperature to high temperature, said modulator driving unit sequentially decreases the number of electrodes from a light input side in said semiconductor electro-absorption optical.

5. The optical transmitter module according to claim 2, wherein, when the number of the electrodes to which the electrical signal is applied is decreased in accordance with the operating temperature change from low temperature to high temperature, said modulator driving unit sequentially decreases the number of electrodes from a light input side in said semiconductor electro-absorption optical modulator.

6. The semiconductor electro-absorption optical modulator according to claim 1,
wherein when the number of the electrodes to which the electrical signal is applied is decreased in accordance with the operating temperature change from low temperature to high temperature, it is sequentially decreased from a light input side.

7. The semiconductor electro-absorption optical modulator according to claim 1,
wherein a direct current is injected into the electrodes to which the electrical signal is not applied in a forward direction, and thus, light output is increased in the optical waveguide below said electrodes.

8. A semiconductor electro-absorption optical modulator integrated laser using the semiconductor electro-absorption optical modulator according to claim 1, comprising:

said semiconductor electro-absorption optical modulator; and a semiconductor laser device, wherein said semiconductor electro-absorption optical modulator and said semiconductor laser device are integrated on one chip in a monolithic manner.

9. An optical transmitter module using the semiconductor electro-absorption optical modulator according to claim 1 or the semiconductor electro-absorption optical modulator integrated laser, comprising:

said semiconductor electro-absorption optical modulator or said semiconductor electro-absorption optical modulator integrated laser, wherein a temperature control mechanism is not provided.

* * * * *